United States Patent
Yoo (10) Patent No.: US 10,954,077 B1
(45) Date of Patent: Mar. 23, 2021

(54) CONVEYOR BELT CLEANING APPARATUS

(71) Applicant: SJE Corporation, Ltd., Busan (KR)

(72) Inventor: Ho-Moog Yoo, Busan (KR)

(73) Assignee: SJE CORPORATION, LTD., Busan (KR)

( * ) Notice: Subject to any disclaimer, the term of this patent is extended or adjusted under 35 U.S.C. 154(b) by 0 days.

(21) Appl. No.: 16/990,186

(22) Filed: Aug. 11, 2020

(30) Foreign Application Priority Data

Nov. 20, 2019 (KR) .......................... 10-2019-0149579

(51) Int. Cl.
*B65G 45/22* (2006.01)

(52) U.S. Cl.
CPC .................................... *B65G 45/22* (2013.01)

(58) Field of Classification Search
CPC ................................. B65G 45/22; B65G 45/14
USPC .................................................. 198/495, 498
See application file for complete search history.

(56) References Cited

U.S. PATENT DOCUMENTS

| | | | | |
|---|---|---|---|---|
| 4,777,972 A * | 10/1988 | Adam | ....................... | B08B 3/02 134/172 |
| 7,077,260 B2 * | 7/2006 | Saballus | ................ | B65G 45/22 134/122 R |
| 7,784,476 B2 * | 8/2010 | Handy | ..................... | B08B 1/04 134/129 |
| 10,266,348 B1 * | 4/2019 | Yoo | ......................... | B65G 45/12 |
| 10,604,354 B2 * | 3/2020 | Handy | ................... | B65G 45/22 |
| 2003/0178048 A1 * | 9/2003 | Honkala | ................ | B41F 35/00 134/104.2 |
| 2015/0053531 A1 * | 2/2015 | Pentzien, Sr. | .......... | B65G 45/22 198/495 |

FOREIGN PATENT DOCUMENTS

| KR | 100863066 | 10/2008 |
|---|---|---|
| KR | 101735062 | 5/2017 |
| KR | 101814279 | 1/2018 |

* cited by examiner

*Primary Examiner* — Mark A Deuble
(74) *Attorney, Agent, or Firm* — Cantor Colburn LLP (57) ABSTRACT

Provided is a conveyor belt cleaning apparatus, and more particularly, to a conveyor belt cleaning apparatus capable of cleaning a conveyor belt by operating in a pneumatic manner using compressed air without using electricity. The conveyor belt cleaning apparatus uses the rodless cylinder so as to enable the steam spray nozzle to perform a reciprocating motion and make it easy to adjust a speed of the steam spray nozzle and adjust a spray range for an object to be cleaned. Further, the conveyor belt cleaning apparatus is structured such that a width in a left-right direction and a height in an up-down direction may be adjusted, such that the conveyor belt cleaning apparatus may be installed on conveyor belts having various sizes, thereby ensuring diversity of use.

4 Claims, 8 Drawing Sheets

CONVEYOR BELT CLEANING APPARATUS

TECHNICAL FIELD

The present invention relates to a conveyor belt cleaning apparatus, and more particularly, to a conveyor belt cleaning apparatus capable of cleaning a conveyor belt by operating in a pneumatic manner using compressed air without using electricity.

BACKGROUND ART

A conveyor refers to a mechanical device that automatically and continuously transports materials or items between positions spaced at a predetermined distance in a factory or the like. The types of conveyors include belt conveyors, screw conveyors, chain conveyors, and the like. Among them, the belt conveyor refers to a device that circulates a belt made of rubber, woven fabric, wire mesh, steel plates, and the like and continuously transports objects placed on the belt. The belt is hung on belt wheels and operated in an endless manner as the belt wheels are rotated by an electric motor.

In general, most conveyor belts for transporting goods, food, and the like are contaminated by foreign substances stuck on surfaces of the conveyor belts when the conveyor belts are used over a long period of time. Therefore, it is necessary to remove the foreign substances.

The surfaces of the conveyor belts used by companies certified for food hygiene management by, for example, HACCP (Hazard Analysis Critical Control Points) need to be simultaneously cleaned and sterilized to eliminate a source of contamination.

Korean Patent No. 10-0863066 discloses an exemplary embodiment of a means for removing foreign substances.

That is, a conveyor belt cleaner in the related art includes: a plurality of scrapers having a pair of fitting holes penetratively formed at both sides at a predetermined interval, having tips formed at both sides, and having a friction damping unit at an inner center thereof; two wires fitted into the pair of fitting holes formed in the plurality of scrapers and fixed in position so as to be wound around a surface of a conveyor belt that rotates on pulleys; a wire fixture positioned at one end of each of the two wires in order to support the wires; and a tightening means fitted with the other end of the wires in order to push the plurality of scrapers to one end, in which a discharge hole is formed in a thickness direction in each of the plurality of scrapers.

However, such a cleaning apparatus is basically operated by electricity, and there is a limitation in that the cleaning apparatus is inevitably used only for a conveyor having a belt that is not opened and has a flat bottom surface. There is also a disadvantage in that the conveyor belt is not completely cleaned and sterilized even though the cleaning operation is performed.

DOCUMENTS OF RELATED ART

Patent Documents

Korean Patent No. 10-1735062 (May 4, 2017)
Korean Patent No. 10-1814279 (Dec. 26, 2017)

SUMMARY OF THE INVENTION

An object of the present invention is to provide a conveyor belt cleaning apparatus capable of cleaning a conveyor belt by operating in a pneumatic manner using pure compressed air, such that conveyor belt cleaning apparatus may be used in various places such as locations where it is difficult to use electricity.

Another object of the present invention is to provide a conveyor belt cleaning apparatus that uses a rodless cylinder so as to enable a spray nozzle to perform a reciprocating motion and make it easy to adjust a speed of the spray nozzle and adjust a spray range for an object to be cleaned.

Still another object of the present invention is to provide a conveyor belt cleaning apparatus structured such that a width in a left-right direction and a height in an up-down direction may be adjusted, such that the conveyor belt cleaning apparatus may be installed on conveyor belts having various sizes.

Yet another object of the present invention is to provide an electric conveyor belt cleaning apparatus to which a system identical to a pneumatic system is applied even in a location where electricity may be used.

In order to achieve the aforementioned objects, the present invention provides a conveyor belt cleaning apparatus including: a support frame 110 installed at a position spaced apart from an upper surface of a conveyor belt 10; a rodless cylinder 120 positioned at a front side of the support frame 110 and including a second movement rail 121 on which a steam spray nozzle 260 is installed to rectilinearly reciprocate; an air regulator 210 installed at one front end of the support frame 110; an air supply on-off valve 220 positioned at one rear side of the support frame 110 and provided at a position adjacent to the air regulator 210; an air control valve 230 positioned at one rear side of the support frame 110 and provided at a position spaced apart from the air supply on-off valve 220 at a predetermined interval; a first valve roller 240 provided at one upper side of the support frame 110; a second valve roller 250 provided at the other upper side of the support frame 110; a steam spray nozzle 260 installed on the second movement rail 121 of the rodless cylinder 120 and connected to one side of a steam spray nozzle hose 400; a first air movement unit 270 installed at one end of the rodless cylinder 120; a second air movement unit 280 installed at the other end of the rodless cylinder 120; and a steam injection valve 290 provided at a position spaced apart from the air regulator 210 at a predetermined interval, and having one side into which steam is injected from the outside, and the other side connected to the other side of the steam spray nozzle hose 400, in which the air regulator 210 includes: an air inlet part 211 to which an air supply hose is connected in order to introduce air from the outside; an air supply part 212 connected to one side of a first connection hose 310 in order to supply the air introduced from the air inlet part 211; and an air adjustment part 213 positioned at one side of the air regulator 210 and configured to adjust the amount of air when the air introduced from the air inlet part 211 is supplied to the air supply part 212, in which the air supply on-off valve 220 includes: a switch part 221 provided at one side of the air supply on-off valve 220 and configured to open or close a second air supply valve connection tube 223 to move the air introduced from the first connection hose 310; a first air supply valve connection tube 222 provided at one side of the air supply on-off valve 220 and connected to the other side of the first connection hose 310 so as to be supplied with the air from the air regulator 210; a second air supply valve connection tube 223 divided into a first branch tube 223a and a second branch tube 223b so that the air introduced from the first air supply valve connection tube 222 is supplied in two directions; and a first supply tube 224 provided adjacent to the first air supply valve connection tube 222 in order to supply the air introduced from the second air supply valve connection tube 223, and in which the air control valve 230 includes a movement route changing body part 231 in which a piston member 231a is provided to perform a cylinder operation when the air is supplied into the movement route changing body part 231.

According to the present invention, the conveyor belt cleaning apparatus may clean a conveyor belt by operating in a pneumatic manner using pure compressed air, such that the conveyor belt cleaning apparatus may be used in various places such as locations where it is difficult to use electricity, and may ensure safety because no electricity is used.

The conveyor belt cleaning apparatus uses the rodless cylinder so as to enable the steam spray nozzle to perform a reciprocating motion and make it easy to adjust a speed of the steam spray nozzle and adjust a spray range for an object to be cleaned. Further, the conveyor belt cleaning apparatus is structured such that a width in a left-right direction and a height in an up-down direction may be adjusted, such that the conveyor belt cleaning apparatus may be installed on various types of conveyor belts having various sizes, thereby ensuring diversity of use.

It is possible to provide the electric conveyor belt cleaning apparatus to which a system identical to a pneumatic system is applied even in a location where electricity may be used.

DETAILED DESCRIPTION

Hereinafter, an exemplary embodiment according to the present invention will be described in detail with reference to the accompanying drawings.

The present invention relates to a conveyor belt cleaning apparatus, and more particularly, to a cleaning apparatus for cleaning a surface of a conveyor belt by controlling a motion of a steam spray nozzle in a pneumatic manner.

Figure 1:
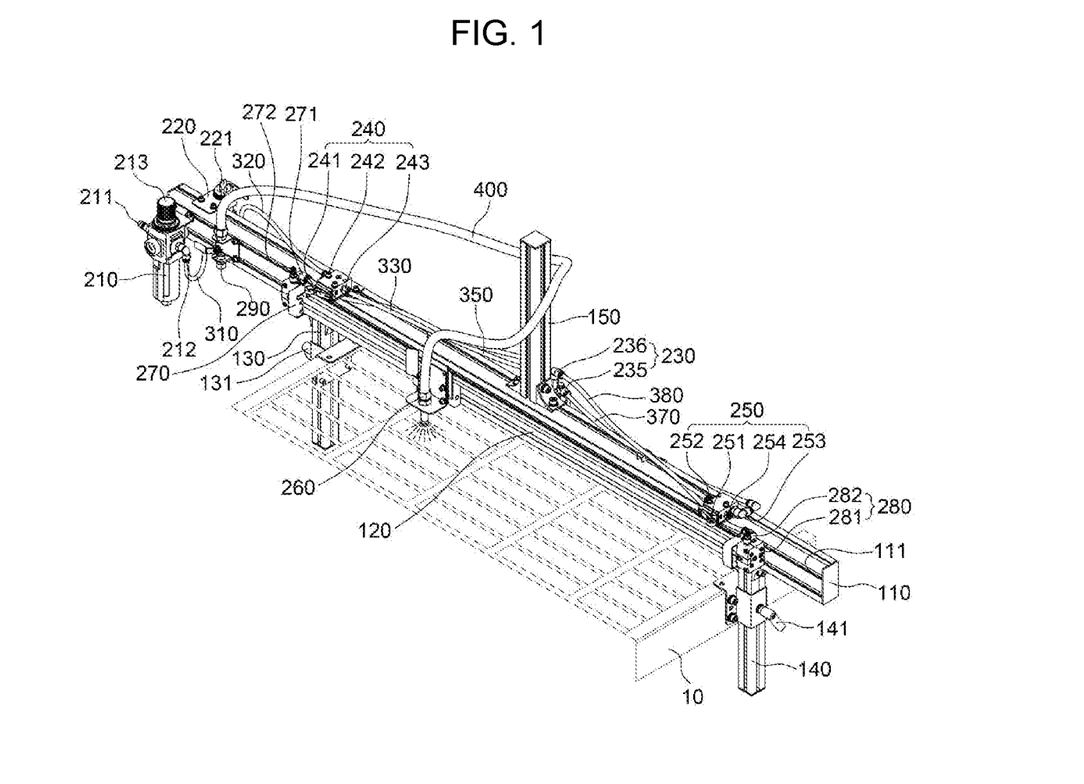
FIG. 1 is a view illustrating a state in which a cleaning apparatus according to the present invention is installed above a conveyor belt.

FIG. 1 is a view illustrating a state in which a cleaning apparatus 1000 according to the present invention is installed above a conveyor belt 10. As illustrated in the drawing, the cleaning apparatus 1000 may be installed above the conveyor belt 10 to clean the surface of the conveyor belt.

Figure 2:
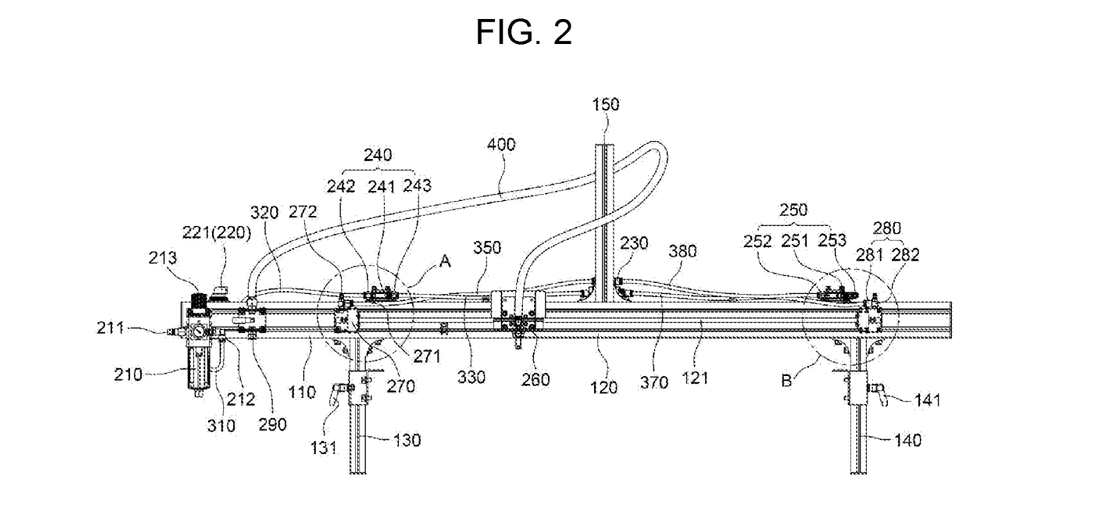
FIG. 2 is a view illustrating the cleaning apparatus according to the present invention when viewed from the front side.
Figure 3:
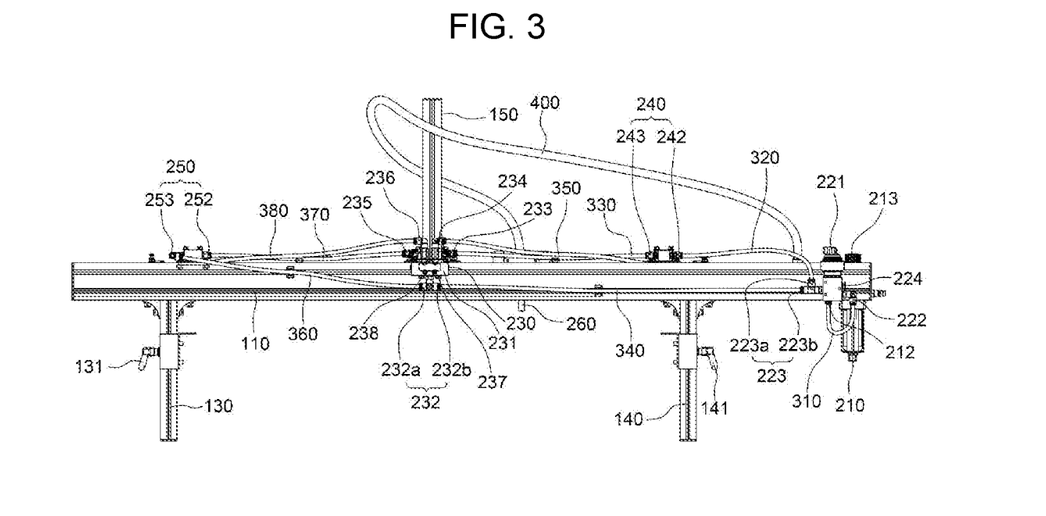
FIG. 3 is a view illustrating the cleaning apparatus according to the present invention when viewed from the rear side.

Constituent elements of the cleaning apparatus 1000 according to the present invention will be specifically described below with reference to FIGS. 2 and 3.

The cleaning apparatus 1000 according to the present invention broadly includes a support frame 110, a rodless cylinder 120, a first height adjustment frame 130, a second height adjustment frame 140, and a stand frame 150 as constituent elements for forming a framework, and includes an air regulator 210, an air supply on-off valve 220, an air control valve 230, a first valve roller 240, a second valve roller 250, a steam spray nozzle 260, a first air movement unit 270, a second air movement unit 280, a steam injection valve 290, a plurality of connection hoses, and a steam spray nozzle hose 400 as constituent elements for applying a pneumatic manner.

The support frame 110 is installed at a position spaced apart from an upper surface of the conveyor belt 10. The support frame 110 has a first movement rail 111, and the rodless cylinder 120 is installed on the first movement rail 111 of the support frame 110, such that a position of the rodless cylinder 120 may be adjusted.

The rodless cylinder 120 is positioned at a front side of the support frame 110 and includes a second movement rail 121 on which the steam spray nozzle 260 is installed to be able to rectilinearly reciprocate. In addition, a length of the rodless cylinder 120 may be adjusted so as to correspond to a width of the conveyor belt 10.

The rodless cylinder 120 is a kind of air cylinder, that is, a well-known component, in which only a piston is inserted into a cylinder body, and the piston is connected to a carriage 122 protruding upward from the cylinder body, such that the carriage 122, together with the piston, is moved forward and rearward by injecting and supplying air.

The rodless cylinder 120 performs a piston motion by air injected from the first air movement unit 270 or the second air movement unit 280, and an operation of the rodless cylinder 120 will be specifically described below when describing the following operating method.

The first height adjustment frame 130 is installed below one side of the support frame 110 and provided to be in contact with one side of the conveyor belt 10.

The first height adjustment frame 130 includes, at one side thereof, a first adjustment lever 131 so that a height of the first height adjustment frame 130 may be adjusted.

The second height adjustment frame 140 is installed below the other side of the support frame 110 and provided to be in contact with the other side of the conveyor belt.

The second height adjustment frame 140 includes, at one side thereof, a second adjustment lever 141 so that a height of the second height adjustment frame 140 may be adjusted.

Figure 4:
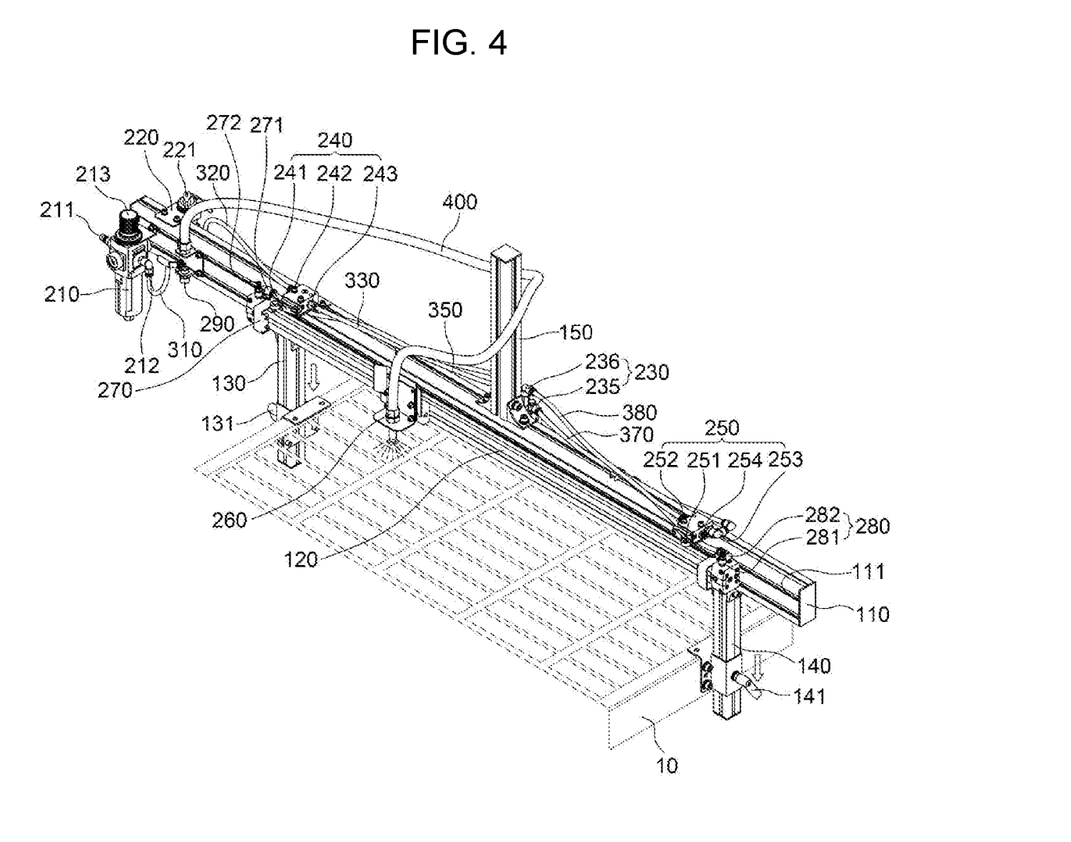
FIG. 4 is a view illustrating an operation of adjusting a height of the cleaning apparatus according to the present invention.

FIG. 4 is a view illustrating a state in which lengths of the first and second height adjustment frames 130 and 140 according to the present invention are adjusted to be higher than those illustrated in FIG. 1 such that a position of the steam spray nozzle is further spaced apart from the surface of the conveyor belt.

The stand frame 150 is installed above one side of the support frame 110, and the air control valve 230 is installed and supported on the stand frame 150.

The air regulator 210 is installed at one front end of the support frame 110 and includes an air inlet part 211, an air supply part 212, and an air adjustment part 213.

An air supply hose is connected to the air inlet part 211 in order to introduce air from the outside, and one side of a first connection hose 310 is connected to the air supply part 212 so that the air introduced from the air inlet part 211 is supplied to the first connection hose 310.

The air adjustment part 213 is positioned at one side of the air regulator 210 and configured to adjust the amount of air when the air introduced from the air inlet part 211 is supplied to the air supply part 212. The amount of air to be supplied may be adjusted by rotating the air adjustment part 213.

For example, when a pressure of air to be supplied is set to 6 bar by using the air adjustment part 213, air with a pressure of 8 bar is introduced into the air inlet part 211, and then air with a pressure of 6 bar is supplied to the air supply part 212 by the setting of the air adjustment part 213.

The air supply on-off valve 220 is positioned at one rear side of the support frame 110 and provided at a position adjacent to the air regulator 210.

The air supply on-off valve 220 includes a switch part 221, a first air supply valve connection tube 222, a second air supply valve connection tube 223, and a first supply tube.

The switch part 221 is provided at one side of the air supply on-off valve 220 and configured to open or close the second air supply valve connection tube 223 in order to move the air introduced from the first connection hose 310.

The first air supply valve connection tube 222 is provided at one side of the air supply on-off valve 220 and connected to the other side of the first connection hose 310 so as to be supplied with the air from the air regulator 210.

The second air supply valve connection tube 223 is divided into a first branch tube 223a and a second branch tube 223b so that the air introduced from the first air supply valve connection tube 222 is supplied in two directions and supplied to a second connection hose 320 and a fourth connection hose 340.

The first branch tube 223a is connected to one side of the second connection hose 320 in order to supply the air introduced from the first air supply valve connection tube 222, and the second branch tube 223b is connected to one side of the fourth connection hose 340 in order to supply the air introduced from the first air supply valve connection tube 222.

The first supply tube 224 is provided adjacent to the first air supply valve connection tube 222 in order to supply the air introduced from the second air supply valve connection tube 223.

The air control valve 230 is positioned at one rear side of the support frame 110 and provided at a position spaced apart from the air supply on-off valve 220 at a predetermined interval.

Figure 5:
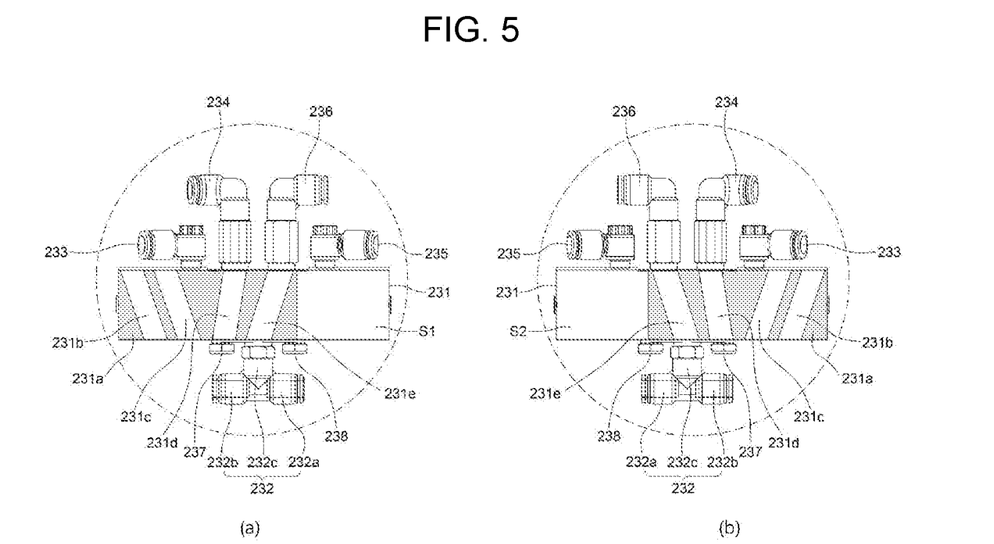
FIG. 5 is a view illustrating an internal appearance of a movement route changing body part according to the present invention.

Referring to FIG. 5, the air control valve 230 includes a movement route changing body part 231, a first air control valve connection tube 232, a second air control valve connection tube 233, a third air control valve connection tube 234, a fourth air control valve connection tube 235, a fifth air control valve connection tube 236, a second supply tube 237, and a third supply tube 238.

A piston member 231a is provided in the movement route changing body part 231 so as to perform a cylinder operation when the air is supplied into the movement route changing body part 231. The piston member 231a includes therein a first movement passage 231b, a second movement passage 231c, a third movement passage 231d, and a fourth movement passage 231e.

The first movement passage 231b is formed in parallel with a line connecting the third air control valve connection tube 234 and the first air control valve connection tube 232 and provided at one side of the piston member 231a.

The second movement passage 231c is formed in parallel with a line connecting the fifth air control valve connection tube 236 and the third supply tube 238 and provided at a position spaced apart from the first movement passage 231b at a predetermined interval.

The third movement passage 231d is formed in parallel with a line connecting the third air control valve connection tube 234 and the second supply tube 237 and provided to be spaced apart from one side of the second movement passage 231c.

The fourth movement passage 231e is formed in parallel with a line connecting the first air control valve connection tube 232 and the fifth air control valve connection tube 236 and provided at one side of the third movement passage 231d.

The first air control valve connection tube 232 is provided at one lower side of the movement route changing body part 231 and divided into a third branch tube 232a and a fourth branch tube 232b so that the air introduced from the first air supply valve connection tube 222 is supplied in two directions.

The second air control valve connection tube 233 is provided at one upper side of the movement route changing body part 231 and connected to one side of a third connection hose 330.

The third air control valve connection tube 234 is provided at an upper side of the movement route changing body part 231, disposed to be spaced apart, at a predetermined interval, from a position adjacent to the second air control valve connection tube 233, and connected to one side of a fifth connection hose 350.

The fourth air control valve connection tube 235 is provided at the upper side of the movement route changing body part 231, disposed to be spaced apart, at a predetermined interval, from a position adjacent to the third air control valve connection tube 234, and connected to one side of a seventh connection hose 370.

The fifth air control valve connection tube 236 is provided at the upper side of the movement route changing body part 231, disposed to be spaced apart, at a predetermined interval, from a position adjacent to the fourth air control valve connection tube 235, and connected to one side of an eighth connection hose 380.

The second supply tube 237 is provided at a lower side of the movement route changing body part 231 and provided at one side of the first air control valve connection tube 232 in order to supply the air introduced from the third air control valve connection tube 234 when the second supply tube 237 is connected to the third movement passage 231d.

The third supply tube 238 is provided at the lower side of the movement route changing body part 231 and provided at the other side of the first air control valve connection tube 232 in order to supply the air introduced from the third air control valve connection tube 234 when the third supply tube 238 is connected to the fourth movement passage 231e.

Figure 6:
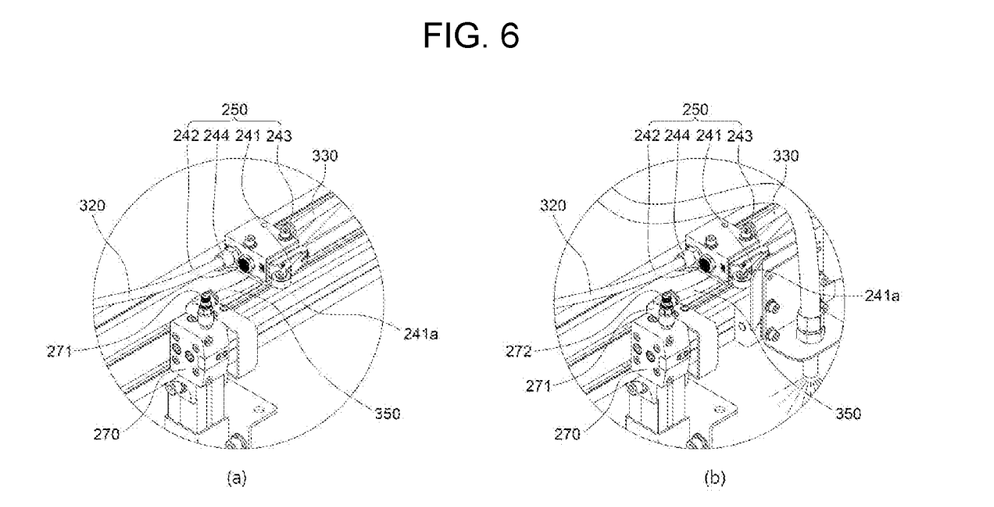
FIG. 6 is an enlarged view of part A in FIG. 2.

Referring to FIG. 6, the first valve roller 240 is provided at one upper side of the support frame 110 and includes a first switch part 241, a first valve roller connection tube 242, and a second valve roller connection tube 243.

The first switch part 241 is provided at one side of the first valve roller 240, has a first roller 241a at one side thereof, and serves to open or close the second valve roller connection tube 243.

As illustrated in FIG. 6B, the closed second valve roller connection tube 243 may be opened when the steam spray nozzle 260 moves to the first switch part 241 and pushes the first switch part 241, and the steam spray nozzle 260 may move in an opposite direction to a direction in which the steam spray nozzle 260 has moved when the first valve roller 241a provided at one end of the first switch part 241 moves the steam spray nozzle 260 in the opposite direction to the direction in which the steam spray nozzle 260 has moved.

The first valve roller connection tube 242 is provided at one side of the first valve roller 240 and connected to the other side of the second connection hose 320.

The second valve roller connection tube 243 is provided at the other side of the first valve roller 240 and connected to the other side of the third connection hose 330.

The fourth supply tube 244 is provided adjacent to the first valve roller connection tube 242 in order to supply the air introduced from the second valve roller connection tube 243.

Figure 7:
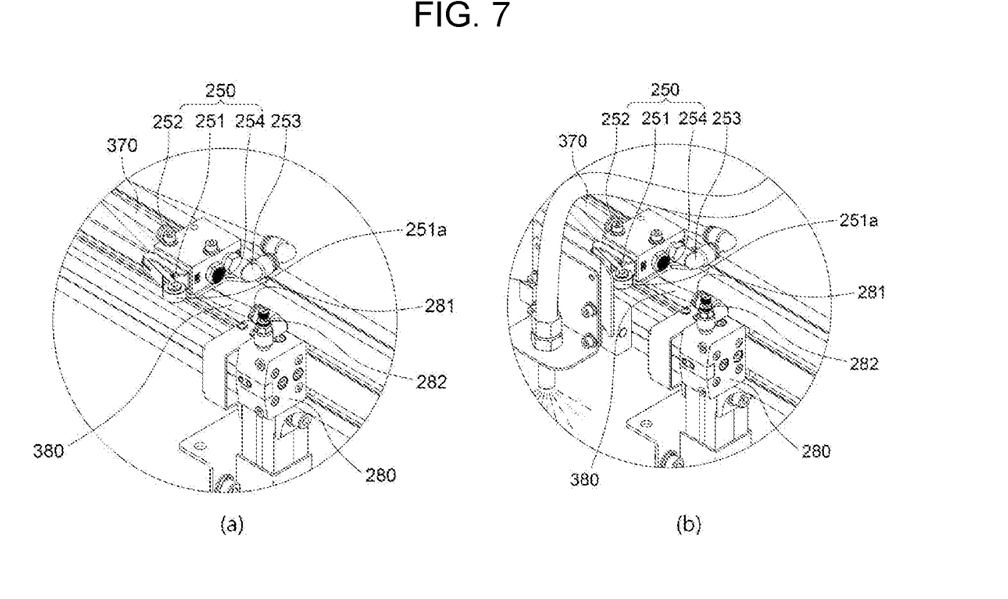
FIG. 7 is an enlarged view of part B in FIG. 2.

Referring to FIG. 7, the second valve roller 250 is provided at the other upper side of the support frame 110 and includes a second switch part 251, a third valve roller connection tube 252, and a fourth valve roller connection tube 253.

The second switch part 251 is provided at one side of the second valve roller 250, has a second roller 251a at one side thereof, and serves to open or close the third valve roller connection tube 252.

As illustrated in FIG. 7B, the closed third valve roller connection tube 252 may be opened when the steam spray nozzle 260 moves to the second switch part 251 and pushes the second switch part 251, and the steam spray nozzle 260 may move in an opposite direction to the direction in which the steam spray nozzle 260 has moved when the second valve roller 251a provided at one end of the second switch part 251 moves the steam spray nozzle 260 in the opposite direction to the direction in which the steam spray nozzle 260 has moved.

The third valve roller connection tube 252 is provided at one side of the second valve roller 250 and connected to the other side of the seventh connection hose 370.

The fourth valve roller connection tube 253 is provided at the other side of the second valve roller 250 and connected to the other side of the sixth connection hose 360.

The fifth supply tube 254 is provided adjacent to the fourth valve roller connection tube 253 in order to supply the air introduced from the third valve roller connection tube 252.

The steam spray nozzle 260 is installed on the second movement rail 121 of the rodless cylinder 120 and connected to one side of the steam spray nozzle hose 400.

The first air movement unit 270 is installed at one end of the rodless cylinder 120, includes a first air movement tube 271 and a first speed control unit 272, and serves to move the air, which is supplied from the first air movement unit 270, to the rodless cylinder 120 or supply the air from the rodless cylinder 120.

The first air movement tube 271 is installed at one side of the first air movement unit 270 and connected to the other side of the fifth connection hose 350.

The first speed control unit 272 is positioned at one side of the first air movement unit 270 and serves to adjust a speed at which the steam spray nozzle 260 moves in a direction toward the second air movement unit 280.

The second air movement unit 280 is installed at the other end of the rodless cylinder 120, includes a second air movement tube 281 and a second speed control unit 282, and serves to move the air, which is supplied from the second air movement unit 280, to the rodless cylinder 120 or supply the air from the rodless cylinder 120.

The second air movement tube 281 is installed at one side of the second air movement unit 280 and connected to the other side of the eighth connection hose 380.

The second speed control unit 282 is positioned at one side of the second air movement unit 280 and serves to adjust a speed at which the steam spray nozzle 260 moves in a direction toward the first air movement unit 270.

The steam injection valve 290 is provided at a position spaced apart from the air regulator 210 at a predetermined interval. Steam is injected into one side of the steam injection valve 290 from the outside, and the other side of the steam injection valve 290 is connected to the other side of the steam spray nozzle hose 400.

In order to move the air, the first, second, third, fourth, fifth, sixth, seventh, and eighth connection hoses 310, 320, 330, 340, 350, 360, 370, and 380 are provided, the first connection hose 310 serves to connect the air supply part 212 of the air regulator 210 and the first air supply valve connection tube 222 of the air supply on-off valve 220, the second connection hose 320 serves to connect the first branch tube 223a of the air supply on-off valve 220 and the first valve roller connection tube 242 of the first valve roller 240, the third connection hose 330 serves to connect the second valve roller connection tube 243 of the first valve roller 240 and the second air control valve connection tube 233 of the air control valve 230, the fourth connection hose 340 serves to connect the second branch tube 223b of the air supply on-off valve 220 and the second branch tube 232b of the air control valve 230, the fifth connection hose 350 serves to connect the first air movement tube 271 of the first air movement unit 270 and the third air control valve connection tube 234 of the air control valve 230, the sixth connection hose 360 serves to connect the third branch tube 232a of the air control valve 230 and the fourth valve roller connection tube 253 of the second valve roller 250, the seventh connection hose 370 serves to connect the fourth air control valve connection tube 235 of the air control valve 230 and the third valve roller connection tube 252 of the second valve roller 250, and the eighth connection hose 380 serves to connect the fifth air control valve connection tube 236 of the air control valve 230 and the second air movement tube 281 of the second air movement unit 280.

The steam spray nozzle hose 400 connects the steam spray nozzle 260 and the steam injection valve 290 in order to move the steam.

An operational example according to the present invention will be described below with reference to FIGS. 8 to 12.

Figure 8:
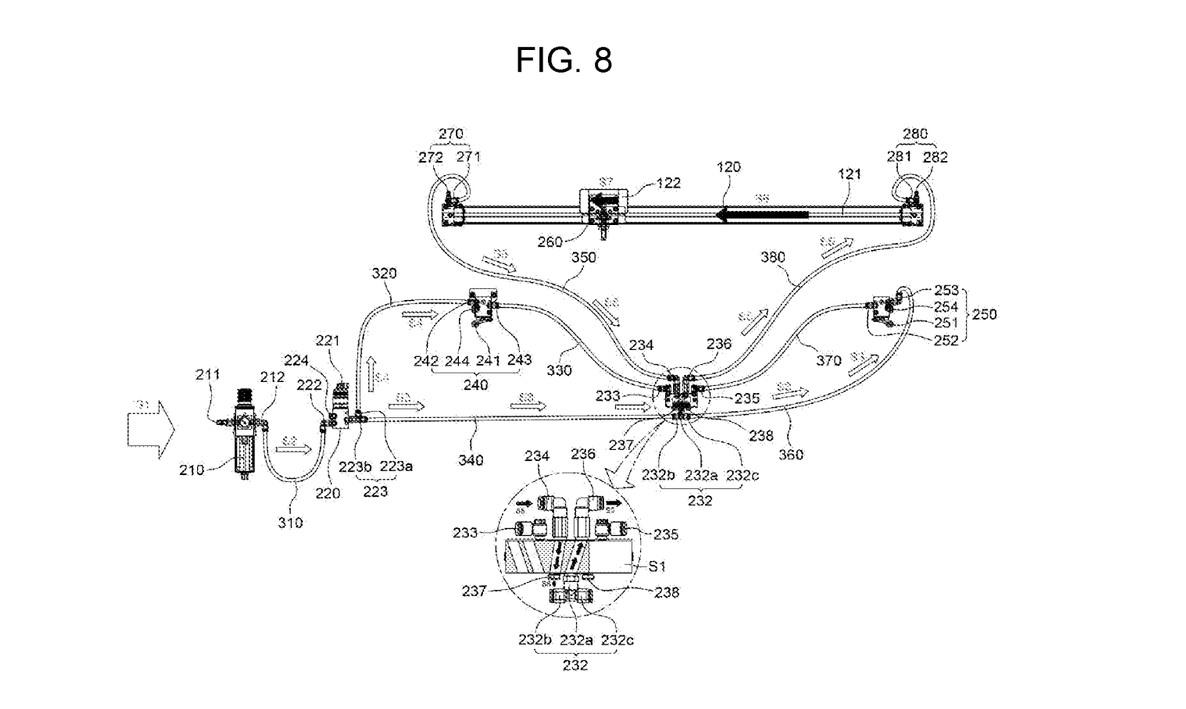
FIGS. 8 to 12 are views illustrating an operational example according to the present invention.

Referring to FIG. 8, the air is injected from the air inlet part 211 of the air regulator 210 (see S1), a pressure of the injected air is adjusted by the air regulator 210, and the air having the adjusted pressure moves in a direction S2 along the first connection hose 310.

The air, which moves in the direction S2 along the first connection hose 310, is injected into the first air supply valve connection tube 222 of the air supply on-off valve 220 and divides and moves into the first branch tube 223a and the second branch tube 223b of the second air supply valve connection tube 223.

The air discharged from the first branch tube 223a moves in a direction S4 along the second connection hose 320 and moves toward the first valve roller 240. The air moved to the first valve roller 240 cannot move any further because the second valve roller connection tube 243 of the first valve roller 240 is closed. When the closed second valve roller connection tube 243 is opened as the first switch part 241 is switched on, the air may move to the third connection hose 330 connected to the second valve roller connection tube 243.

The air discharged from the second branch tube 223b moves in a direction S3 along the fourth connection hose 340, passes through the fourth branch tube 232b at one side of the first air control valve connection tube 232 of the air control valve 230, and divides and moves into the valve connecting portion 232*c* and the third branch tube 232*a* of the first air control valve connection tube 232.

The air moved to the third branch tube 232*a* moves in the direction S3 along the sixth connection hose 360 and moves to the fourth valve roller connection tube 253 of the second valve roller 250. The air moved to the fourth valve roller connection tube 253 cannot move any further because the third valve roller connection tube 252 is closed. When the third valve roller connection tube 252 is opened as the second switch part 251 is switched on, the air may move to the seventh connection hose 370.

The air moved to the valve connecting portion 232*c* of the air control valve 230 moves toward the fifth air control valve connection tube 236 while passing through the fourth movement passage 231*e* of the movement route changing body part 231 and moves in a direction S5 along the eighth connection hose 380 connected to the fifth air control valve connection tube 236. The air moved along the eighth connection hose 800 is moved to the second air movement tube 281 of the second air movement unit 280 and then injected into the rodless cylinder 120, such that the carriage 122, on which the steam spray nozzle 260 is installed, is moved by a pressure of the air in a direction S7 toward the first air movement unit 270.

Figure 9:
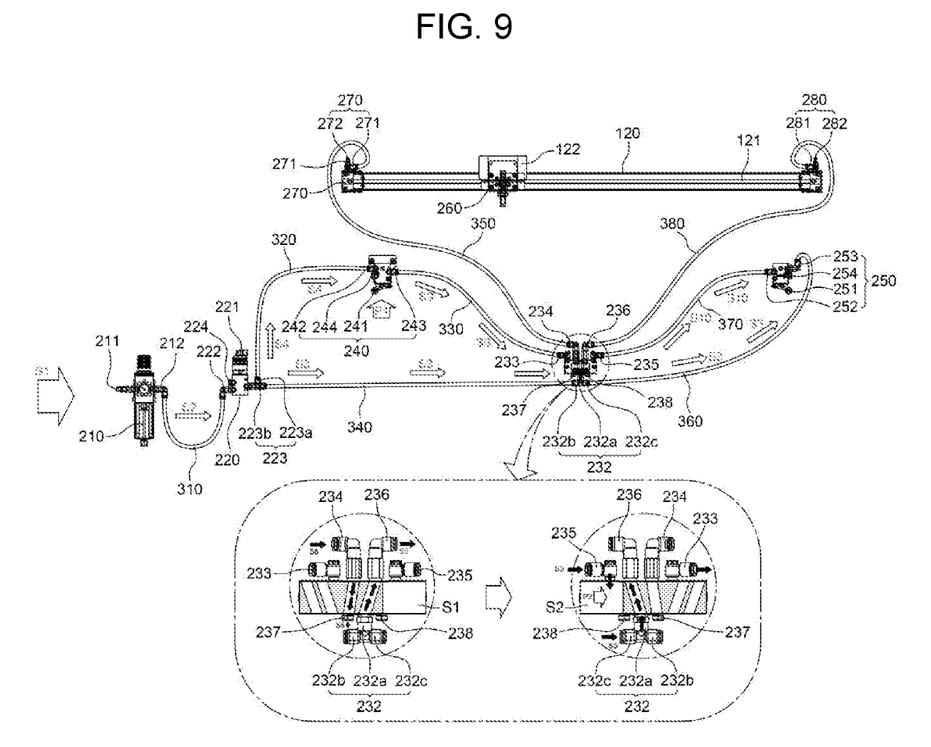

Referring to FIG. 9, when the steam spray nozzle 260 is moved in the direction toward the first air movement unit 270, as illustrated in FIG. 8, and pushes (see P1) the second switch part 251 of the second valve roller 250 as illustrated in FIG. 6B, the second switch part 251 is switched on, such that the closed second valve roller connection tube 243 is opened. As the second valve roller connection tube 243 is opened, the air, which is injected into the first valve roller connection tube 242 from the second connection hose 320, passes through the second valve roller connection tube 243 and moves in a direction S9 to the third connection hose 330.

Referring to enlarged cross-sectional views of the air control valve 230, as illustrated in FIG. 9A, the air moved to the second air control valve connection tube 233 of the air control valve 230 is injected into the movement route changing body part 231, and as illustrated in FIG. 9B, the air pushes the piston member 231*a* in a direction P2, such that movement routes of the respective tubes of the air control valve 230 are changed. Therefore, the air in a section S1 in FIG. 9A is supplied from the fourth air control valve connection tube 235 to the seventh connection hose 370, and the air is moved in a direction S10.

Figure 10:
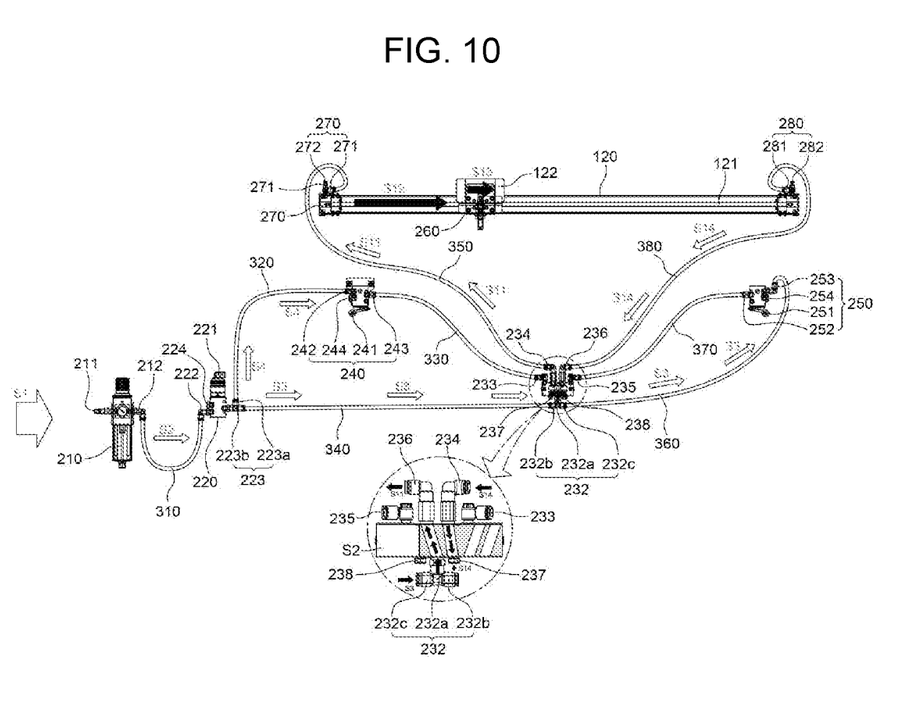

The air introduced into the fourth branch tube 232*b* passes through the first movement passage 231*b* and is discharged to the second air control valve connection tube 234, such that as illustrated in FIG. 10, the air is introduced into the fifth connection hose 350 and moved in a direction S11, and as a result, the air is introduced into the first air movement tube 271 of the first air movement unit 270. The air moved to the first air movement tube 271 is introduced into the rodless cylinder 120 (see a direction S12), and the carriage 122 coupled to the steam spray nozzle 260 is moved by the introduced air in a direction S13 toward the second air movement unit 280.

Figure 11:
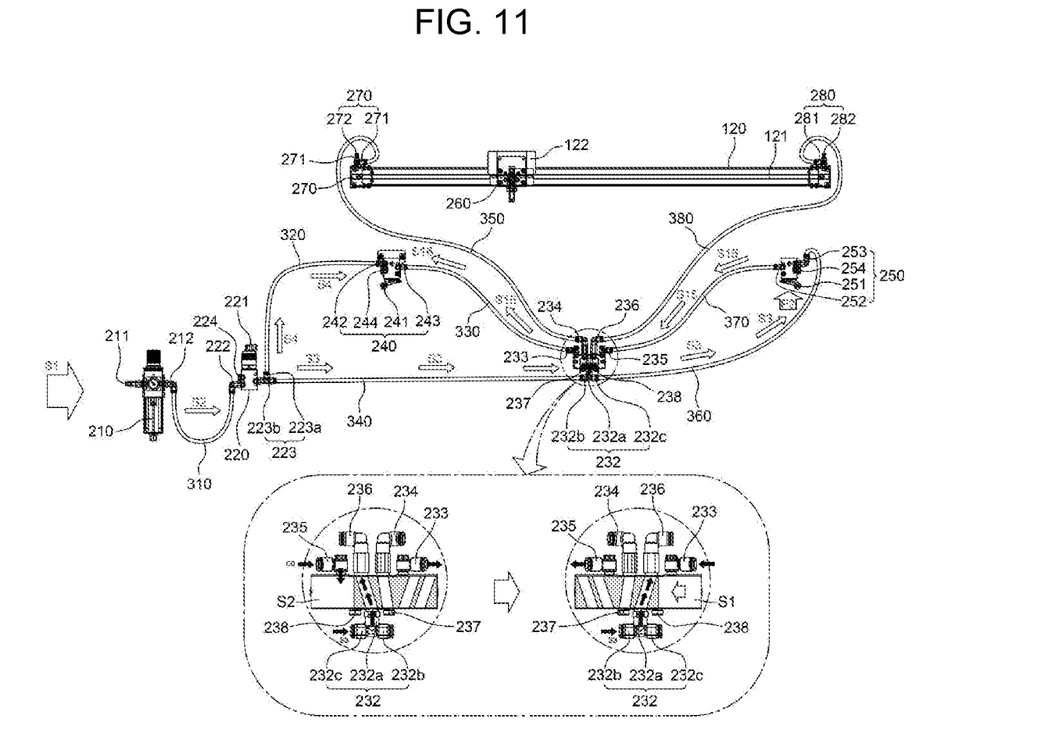
Figure 12:
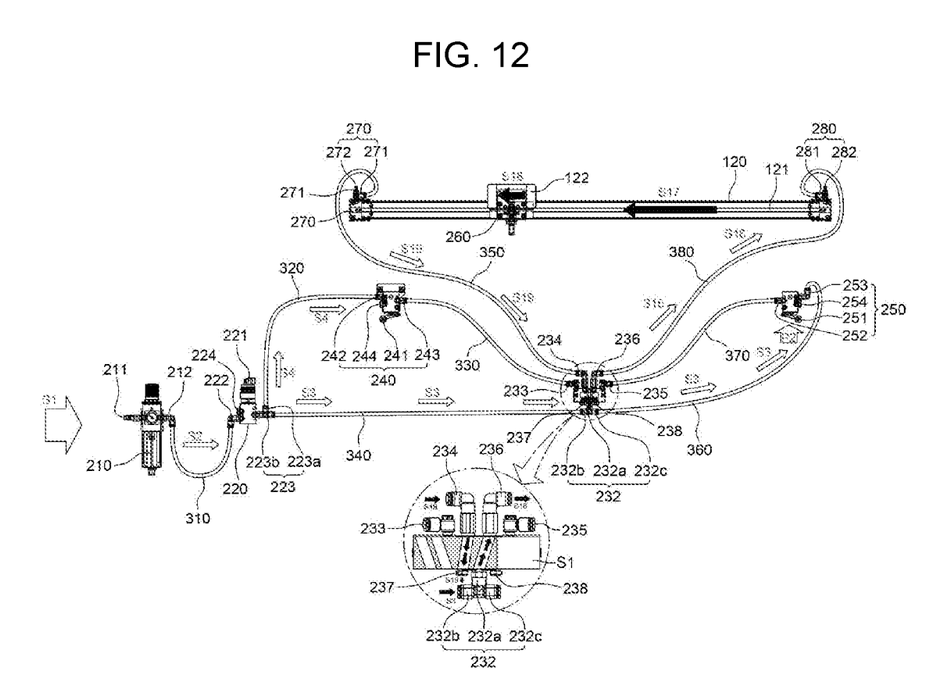

FIG. 11 is a view illustrating a state in which the air moves when the carriage 122 coupled to the steam spray nozzle 260 moves to the second valve roller 250 and pushes (in the direction P2) the second switch part 251 of the second valve roller 250 as illustrated in FIG. 7B. The third valve roller connection tube 252 is opened as the second switch part 251 is pushed, such that the air moves in a direction S15 along the seventh connection hose 370. The air moved to the seventh connection hose 370 is introduced into the movement route changing body part 231 through the fourth air control valve connection tube 235 and moves the piston member 231*a* in a direction P3 as illustrated in FIG. 11B. As the piston member 231*a* is moved, the air introduced into the valve connecting portion 232*c* of the air control valve 230 moves out of the fifth air control valve connection tube 236 through the fourth movement passage 231*e* and moves to the eighth connection hose 380 as illustrated in FIG. 12 (see a direction S16).

The air moved to the eighth connection hose 380 is introduced into the second air movement tube 281 of the second air movement unit 280 and moved to the rodless cylinder 120, and the air introduced in a direction S17 pushes the carriage 122, such that the carriage moves in a direction S18 toward the first air movement unit 270. In this case, the air received in a space in the rodless cylinder 120 between the first air movement unit 270 and the carriage 122 is discharged to the first air movement tube 271 of the first air movement unit 270 and moved along the fifth connection hose 350.

As the above-mentioned operations are continuously repeated, the steam spray nozzle may reciprocate to the left and the right, thereby completely cleaning the surface of the conveyor belt.

While the present invention has been described with reference to the accompanying drawings and the exemplary embodiments, it is apparent to those skilled in the art that many various and obvious modifications can be made from the description without departing from the scope of the present invention. Accordingly, the scope of the present invention should be interpreted by the claims defined to include the many modified examples.

What is claimed is:

1. A conveyor belt cleaning apparatus comprising:
   a support frame 110 installed at a position spaced apart from an upper surface of a conveyor belt 10;
   a rodless cylinder 120 positioned at a front side of the support frame 110 and comprising a second movement rail 121 on which a steam spray nozzle 260 is installed to rectilinearly reciprocate;
   an air regulator 210 installed at one front end of the support frame 110;
   an air supply on-off valve 220 positioned at one rear side of the support frame 110 and provided at a position adjacent to the air regulator 210;
   an air control valve 230 positioned at one rear side of the support frame 110 and provided at a position spaced apart from the air supply on-off valve 220 at a predetermined interval;
   a first valve roller 240 provided at one upper side of the support frame 110;
   a second valve roller 250 provided at the other upper side of the support frame 110;
   a steam spray nozzle 260 installed on the second movement rail 121 of the rodless cylinder 120 and connected to one side of a steam spray nozzle hose 400;
   a first air movement unit 270 installed at one end of the rodless cylinder 120;
   a second air movement unit 280 installed at the other end of the rodless cylinder 120; and
   a steam injection valve 290 provided at a position spaced apart from the air regulator 210 at a predetermined interval, and having one side into which steam is injected from the outside, and the other side connected to the other side of the steam spray nozzle hose 400, wherein air supplied from the first air movement unit 270 is introduced into one side of the rodless cylinder 120, and air supplied from the second air movement unit 280 is introduced into the other side of the rodless cylinder 120, such that the rodless cylinder 120 performs a piston motion.

2. The conveyor belt cleaning apparatus of claim 1, wherein the air regulator 210 comprises:
   an air inlet part 211 to which an air supply hose is connected in order to introduce air from the outside;
   an air supply part 212 connected to one side of a first connection hose 310 in order to supply the air introduced from the air inlet part 211; and
   an air adjustment part 213 positioned at one side of the air regulator 210 and configured to adjust the amount of air when the air introduced from the air inlet part 211 is supplied to the air supply part 212,
   wherein the air supply on-off valve 220 comprises:
   a switch part 221 provided at one side of the air supply on-off valve 220 and configured to open or close a second air supply valve connection tube 223 to move the air introduced from the first connection hose 310;
   a first air supply valve connection tube 222 provided at one side of the air supply on-off valve 220 and connected to the other side of the first connection hose 310 so as to be supplied with the air from the air regulator 210;
   a second air supply valve connection tube 223 divided into a first branch tube 223a and a second branch tube 223b so that the air introduced from the first air supply valve connection tube 222 is supplied in two directions; and
   a first supply tube 224 provided adjacent to the first air supply valve connection tube 222 in order to supply the air introduced from the second air supply valve connection tube 223, and
   wherein the air control valve 230 comprises a movement route changing body part 231 in which a piston member 231a is provided to perform a cylinder operation when the air is supplied into the movement route changing body part 231.

3. The conveyor belt cleaning apparatus of claim 2, further comprising:
   a first height adjustment frame 130 installed at one lower side of the support frame 110 and provided to be in contact with one side of the conveyor belt 10; and
   a second height adjustment frame 140 installed at the other lower side of the support frame 110 and provided to be in contact with the other side of the conveyor belt,
   wherein the first height adjustment frame 130 further comprises, at one side thereof, a first adjustment lever 131 so that a height of the first height adjustment frame 130 is adjustable, and the second height adjustment frame 140 further comprises, at one side thereof, a second adjustment lever 141 so that a height of the second height adjustment frame 140 is adjustable.

4. A conveyor belt cleaning apparatus comprising:
   a support frame 110 installed at a position spaced apart from an upper surface of a conveyor belt 10;
   a rodless cylinder 120 positioned at a front side of the support frame 110 and comprising a second movement rail 121 on which a steam spray nozzle 260 is installed to rectilinearly reciprocate;
   a first height adjustment frame 130 installed at one lower side of the support frame 110 and provided to be in contact with one side of the conveyor belt 10;
   a second height adjustment frame 140 installed at the other lower side of the support frame 110 and provided to be in contact with the other side of the conveyor belt;
   a stand frame 150 installed at one upper side of the support frame 110 and configured to support an air control valve 230 installed on the stand frame 150;
   an air regulator 210 installed at one front end of the support frame 110;
   an air supply on-off valve 220 positioned at one rear side of the support frame 110 and provided at a position adjacent to the air regulator 210;
   an air control valve 230 positioned at one rear side of the support frame 110 and provided at a position spaced apart from the air supply on-off valve 220 at a predetermined interval;
   a first valve roller 240 provided at one upper side of the support frame 110;
   a second valve roller 250 provided at the other upper side of the support frame 110;
   a steam spray nozzle 260 installed on the second movement rail 121 of the rodless cylinder 120 and connected to one side of a steam spray nozzle hose 400;
   a first air movement unit 270 installed at one end of the rodless cylinder 120;
   a second air movement unit 280 installed at the other end of the rodless cylinder 120;
   a steam injection valve 290 provided at a position spaced apart from the air regulator 210 at a predetermined interval and having one side into which steam is injected from the outside, and the other side connected to the other side of the steam spray nozzle hose 400;
   a first connection hose 310 configured to connect an air supply part 212 of the air regulator 210 and a first air supply valve connection tube 222 of the air supply on-off valve 220;
   a second connection hose 320 configured to connect a first branch tube 223a of the air supply on-off valve 220 and a first valve roller connection tube 242 of the first valve roller 240;
   a third connection hose 330 configured to connect a second valve roller connection tube 243 of the first valve roller 240 and a second air control valve connection tube 233 of the air control valve 230;
   a fourth connection hose 340 configured to connect a second branch tube 223b of the air supply on-off valve 220 and a second branch tube 232b of the air control valve 230;
   a fifth connection hose 350 configured to connect a first air movement tube 271 of the first air movement unit 270 and a third air control valve connection tube 234 of the air control valve 230;
   a sixth connection hose 360 configured to connect a third branch tube 232a of the air control valve 230 and a fourth valve roller connection tube 253 of the second valve roller 250;
   a seventh connection hose 370 configured to connect a fourth air control valve connection tube 235 of the air control valve 230 and a third valve roller connection tube 252 of the second valve roller 250;
   an eighth connection hose 380 configured to connect a fifth air control valve connection tube 236 of the air control valve 230 and a second air movement tube 281 of the second air movement unit 280; and
   the steam spray nozzle hose 400 configured to connect the steam spray nozzle 260 and the steam injection valve 290 in order to move steam, wherein the first height adjustment frame 130 comprises, at one side thereof, a first adjustment lever 131 so that a height of the first height adjustment frame 130 is adjustable, and the second height adjustment frame 140 comprises, at one side thereof, a second adjustment lever 141 so that a height of the second height adjustment frame 140 is adjustable, wherein the air regulator 210 comprises:

an air inlet part 211 to which an air supply hose is connected in order to introduce air from the outside;

an air supply part 212 connected to one side of the first connection hose 310 in order to supply the air introduced from the air inlet part 211; and an air adjustment part 213 positioned at one side of the air regulator 210 and configured to adjust the amount of air when the air introduced from the air inlet part 211 is supplied to the air supply part 212, wherein the air supply on-off valve 220 comprises:

a switch part 221 provided at one side of the air supply on-off valve 220 and configured to open or close a second air supply valve connection tube 223 to move the air introduced from the first connection hose 310;

a first air supply valve connection tube 222 provided at one side of the air supply on-off valve 220 and connected to the other side of the first connection hose 310 so as to be supplied with the air from the air regulator 210;

a second air supply valve connection tube 223 divided into a first branch tube 223a and a second branch tube 223b so that the air introduced from the first air supply valve connection tube 222 is supplied in two directions; and a first supply tube 224 provided adjacent to the first air supply valve connection tube 222 in order to supply the air introduced from the second air supply valve connection tube 223, wherein the first branch tube 223a of the second air supply valve connection tube 223 is connected to one side of the second connection hose 320 in order to supply the air introduced from the first air supply valve connection tube 222, and the second branch tube 223b is connected to one side of the fourth connection hose 340 in order to supply the air introduced from the first air supply valve connection tube 222, wherein the air control valve 230 comprises:

a movement route changing body part 231 in which a piston member 231a is provided to perform a cylinder operation when the air is supplied into the movement route changing body part 231;

a first air control valve connection tube 232 provided at one lower side of the movement route changing body part 231 and divided into the third branch tube 232a and a fourth branch tube 232b so that the air introduced from the air supply valve connection tube 222 is supplied in two directions;

the second air control valve connection tube 233 provided at one upper side of the movement route changing body part 231 and connected to one side of the third connection hose 330;

the third air control valve connection tube 234 provided at an upper side of the movement route changing body part 231, disposed spaced apart, at a predetermined interval, from a position adjacent to the second air control valve connection tube 233, and connected to one side of the fifth connection hose 350;

the fourth air control valve connection tube 235 provided at the upper side of the movement route changing body part 231, disposed spaced apart, at a predetermined interval, from a position adjacent to the third air control valve connection tube 234, and connected to one side of the seventh connection hose 370;

the fifth air control valve connection tube 236 provided at the upper side of the movement route changing body part 231, disposed spaced apart, at a predetermined interval, from a position adjacent to the fourth air control valve connection tube 235 and connected to one side of the eighth connection hose 380;

a second supply tube 237 provided at a lower side of the movement route changing body part 231 and disposed at one side of the first air control valve connection tube 232 in order to supply the air introduced from the third air control valve connection tube 234 when the second supply tube 237 is connected to a third movement passage 231d; and a third supply tube 238 provided at the lower side of the movement route changing body part 231 and disposed at the other side of the first air control valve connection tube 232 in order to supply the air introduced from the third air control valve connection tube 234 when the third supply tube 238 is connected to a fourth movement passage 231e, wherein the piston member 231a of the movement route changing body part 231 comprises:

a first movement passage 231b formed in parallel with a line connecting the third air control valve connection tube 234 and the first air control valve connection tube 232 and formed at one side of the piston member 231a;

a second movement passage 231c formed in parallel with a line connecting the fifth air control valve connection tube 236 and the third supply tube 238 and at a position spaced apart from the first movement passage 231b at a predetermined interval;

the third movement passage 231d formed in parallel with a line connecting the third air control valve connection tube 234 and the second supply tube 237 and formed spaced apart from one side of the second movement passage 231c; and the fourth movement passage 231e formed in parallel with a line connecting the first air control valve connection tube 232 and the fifth air control valve connection tube 236 and formed at one side of the third movement passage 231d, wherein the first valve roller 240 comprises:

a first switch part 241 provided at one side of the first valve roller 240 and having a first roller 241a formed at one side thereof in order to open or close the second valve roller connection tube 243;

the first valve roller connection tube 242 provided at one side of the first valve roller 240 and connected to the other side of the second connection hose 320;

the second valve roller connection tube 243 provided at the other side of the first valve roller 240 and connected to the other side of the third connection hose 330; and a fourth supply tube 244 provided adjacent to the first valve roller connection tube 242 in order to supply the air introduced from the second valve roller connection tube 243, wherein the second valve roller 250 comprises:

a second switch part 251 provided at one side of the second valve roller 250 and having a second roller 251a formed at one side thereof in order to open or close the third valve roller connection tube 252;

the third valve roller connection tube 252 provided at one side of the second valve roller 250 and connected to the other side of the seventh connection hose 370;

the fourth valve roller connection tube 253 provided at the other side of the second valve roller 250 and connected to the other side of the sixth connection hose 360; and a fifth supply tube 254 provided adjacent to the fourth valve roller connection tube 253 in order to supply the air introduced from the third valve roller connection tube 252, wherein the first air movement unit 270 comprises:

the first air movement tube 271 installed at one side of the first air movement unit 270 and connected to the other side of the fifth connection hose 350; and a first speed control unit 272 positioned at one side of the first air movement unit 270 and configured to adjust a speed at which the steam spray nozzle 260 moves in a direction toward the second air movement unit 280, and wherein the second air movement unit 280 comprises:

the second air movement tube 281 installed at one side of the second air movement unit 280 and connected to the other side of the eighth connection hose 380; and a second speed control unit 282 positioned at one side of the second air movement unit 280 and configured to adjust a speed at which the steam spray nozzle 260 moves in a direction toward the first air movement unit 270.

\* \* \* \* \*